Oct. 20, 1959 A. J. LACROIX, JR 2,909,258
LIQUID COOLED HYDRAULICALLY OPERATED CLUTCH
Filed Oct. 17, 1956 3 Sheets-Sheet 1
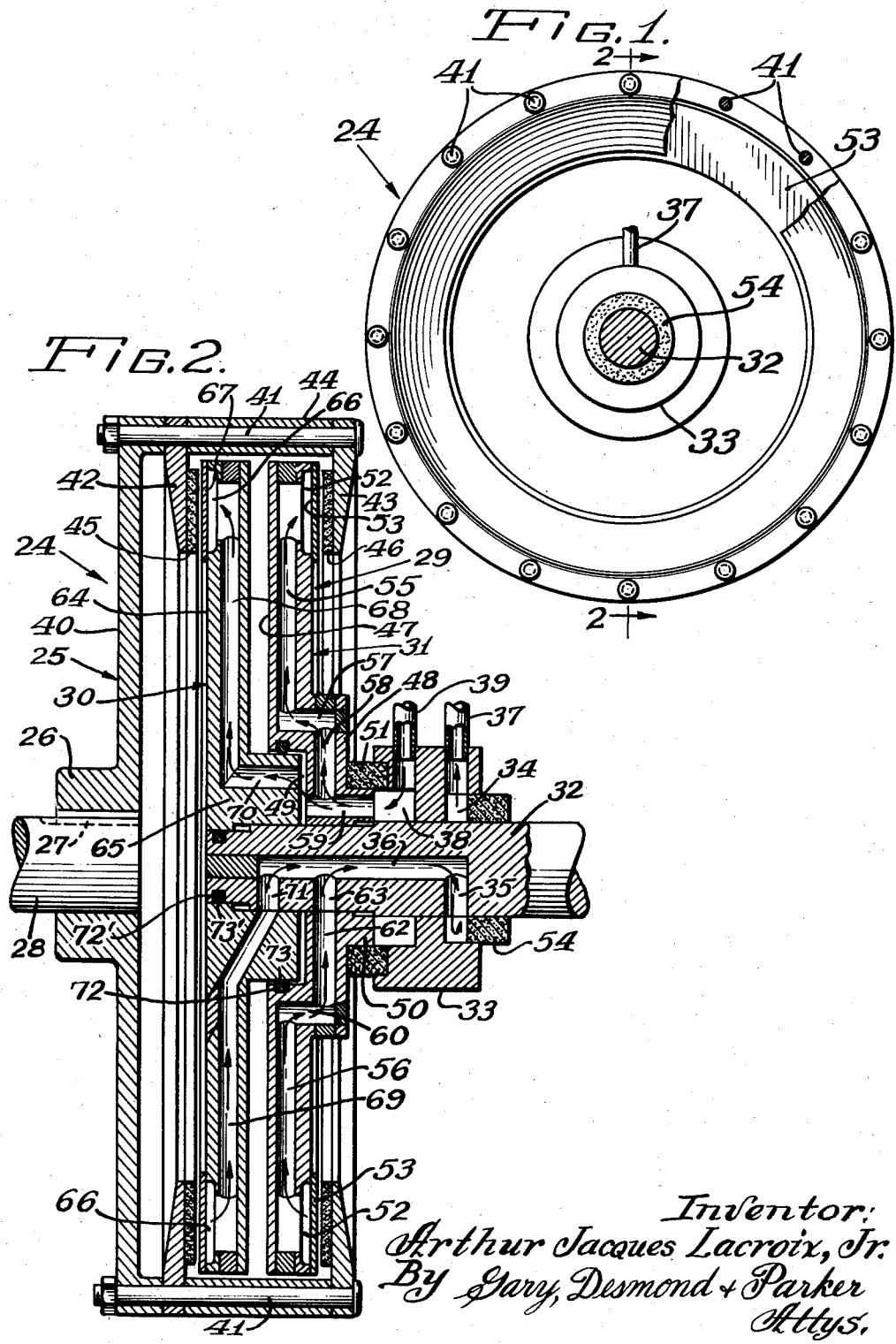
Inventor:
Arthur Jacques Lacroix, Jr.
By Gary, Desmond + Parker
Attys.

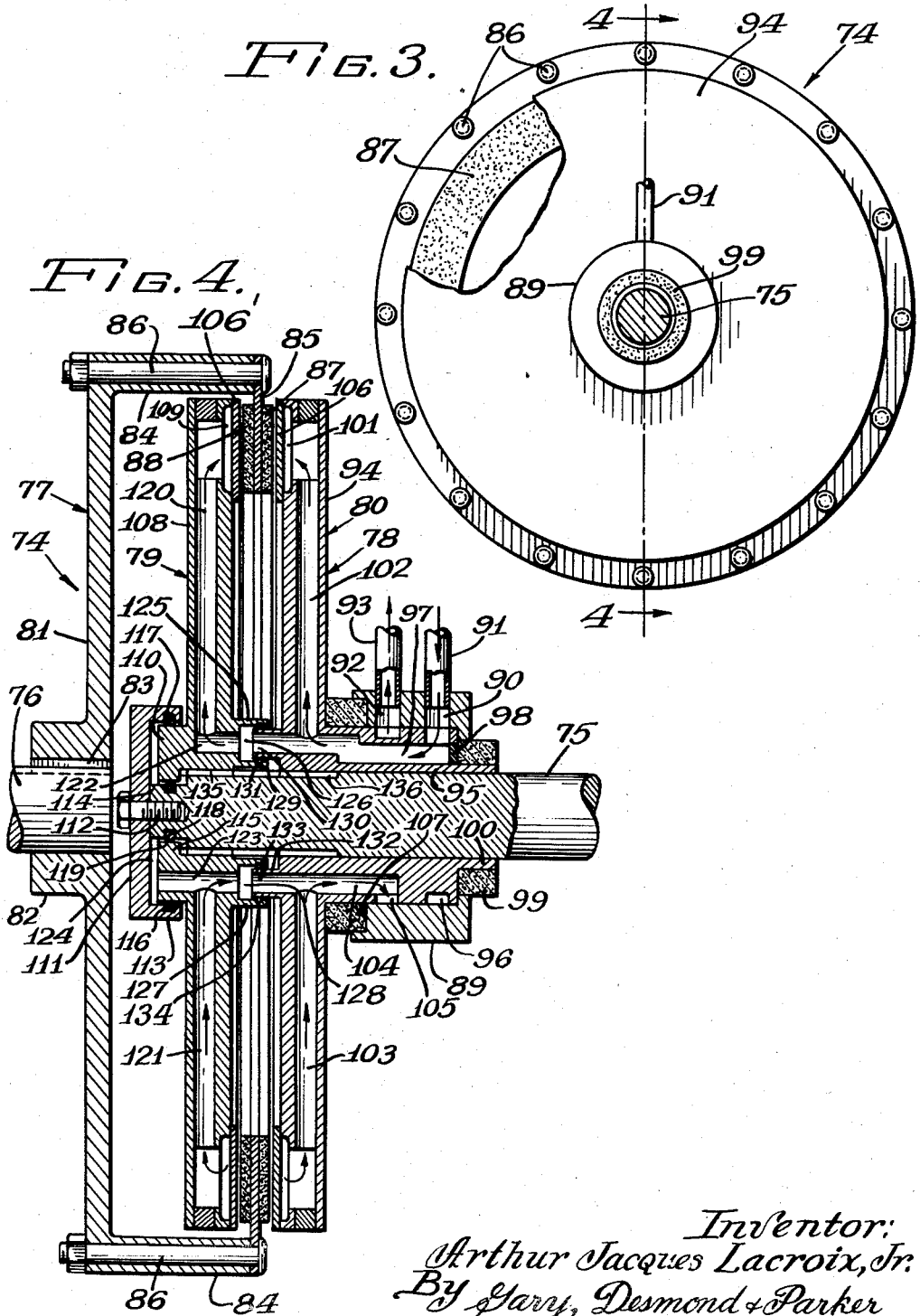

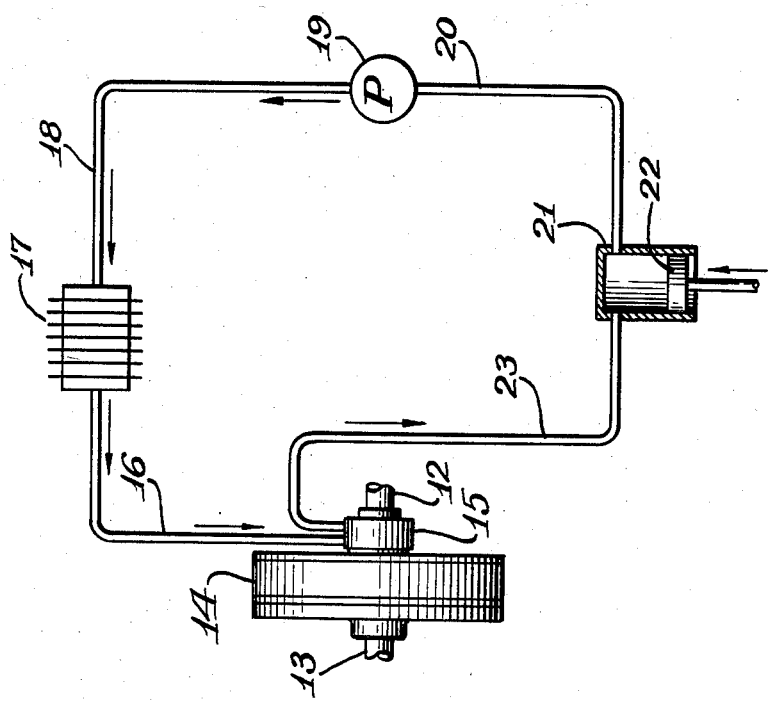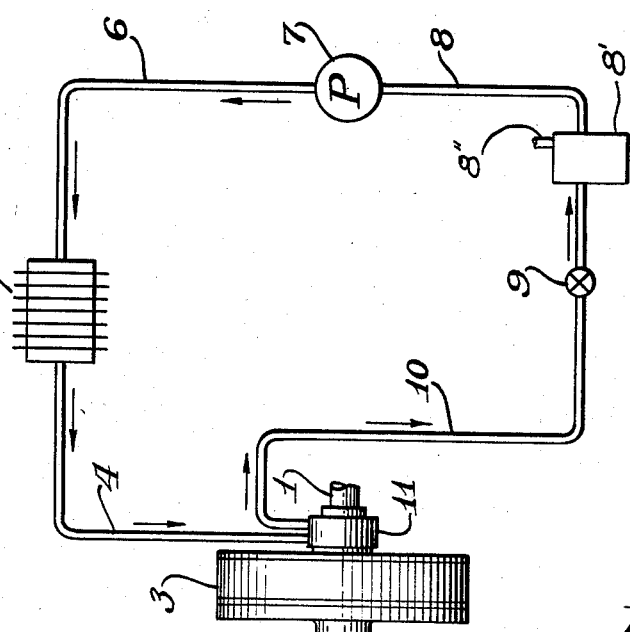

United States Patent Office 2,909,258
Patented Oct. 20, 1959

2,909,258

LIQUID COOLED HYDRAULICALLY OPERATED CLUTCH

Arthur Jacques Lacroix, Jr., Stratford, Conn., assignor to Raybestos-Manhattan, Inc., Passaic, N.J., a corporation of New Jersey Application October 17, 1956, Serial No. 616,468

8 Claims. (Cl. 192—113)

This invention relates to improvements in a liquid cooled clutch employed for power transmission purposes, and refers particularly to a liquid cooled clutch which is hydraulically actuated and wherein the liquid pressure produced by centrifugal force of the rotating clutch is reduced in magnitude to the extent that it is negligible in influencing the actuation of the clutch.

In hydraulically actuated clutches, the actuation of the clutch is dependent upon the pressure of the hydraulic fluid applied to the engaging elements of the clutch. In order that the engagement of the clutch be controllable by the operator, changes of liquid pressure in the clutch must be a function substantially only of the operator's control manipulations.

Where the same liquid is used not only to actuate the clutch but also to cool it, difficulties are encountered. The engaging elements of the clutch, where heat due to slippage occurs, are radially spaced from the axis of rotation of the clutch. In order to liquid cool the engaging elements, the cooling liquid must flow adjacent said engaging surfaces. Hence, during the operation of the clutch, that is, during rotation thereof, the liquid adjacent the engaging elements is subjected to centrifugal force which would normally change its pressure as a function of the rotary speed of the clutch and inasmuch as the same liquid is the liquid which actuates the clutch, it can be appreciated that the pressure due to centrifugal force (an uncontrolled pressure) is superimposed upon the operator's controlled pressure. Hence, the control of the actuation of the clutch is substantially taken from the operator's hands.

The present invention is directed to a clutch mechanism of the class described wherein the effect of pressure due to centrifugal force is so reduced in magnitude as to render said pressure substantially negligible in so far as affecting the actuation of the clutch is concerned.

The operation, objects and advantages of the present invention will be apparent from the accompanying drawings and following detailed description.

In the drawings:

Fig. 1 is a front face view of a clutch embodying the features of the present invention.

Fig. 2 is an enlarged transverse sectional view taken on line 2—2 of Fig. 1.

Fig. 3 is a view similar to Fig. 1 of a modification of the invention.

Fig. 4 is an enlarged sectional view taken on line 4—4 of Fig. 3.

Fig. 5 is a diagrammatic view of an hydraulic actuating and cooling circuit with which the present invention may be used.

Fig. 6 is a view similar to Fig. 5 showing a modified hydraulic actuating and cooling circuit.

Referring in detail to the drawings and with specific reference to Fig. 5, 1 indicates a driving shaft and 2 indicates a driven shaft of a power transmission system. The driving shaft 1 is controllably connected to the driven shaft 2 by a clutch mechanism 3. The clutch mechanism 3 is of the type which is hydraulically actuated and also liquid cooled. The clutch 3 is connected to an external hydraulic actuating and cooling circuit comprising pipe 4 which connects at one end into a conventional heat exchanger 5, the opposite end of which is connected by means of pipe 6 to pump 7. The inlet side of pump 7 is connected by means of pipe 8 through expansion chamber 8', having a vent 8" to atmosphere, to a throttle valve 9, the opposite side of which is connected by means of pipe 10 to a coupling 11 which also connects with pipe 4.

The operation of the circuit illustrated in Fig. 7 is as follows:

Pump 7 may be continuously driven or, alternatively, driven during the engagement of the clutch, including the time during which engagement takes place. When the valve 9 is completely open liquid circulates through the system including the clutch but the pressure of said liquid is not sufficient to cause engagement of the clutch elements. When it is desired to engage the clutch elements, that is to operatively connect the driving shaft 1 to the driven shaft 2, the valve 9 is moved toward closed position. By thus throttling the flow in the piping system, the liquid pressure within the clutch increases and hence the clutch elements are brought into engagement. The construction of pump 7 is such that it will maintain an adequate circulation of liquid even though the valve 9 is throttled. Pump 7 must then be either of the positive displacement variety or else of relatively high capacity.

Referring particularly to Fig. 6, the clutch comprising the present invention may be connected in a circuit such as illustrated. In Fig. 6 the reference numeral 12 indicates a driving shaft and the numeral 13 indicates a driven shaft of a power transmission, the shafts being controllably connected by means of a clutch 14. The clutch 14 is shown diagrammatically and is of the hydraulic actuated liquid cooled type. Coupling 15 carried by the clutch 14 connects with a pipe 16 which at its opposite end connects with a suitable heat exchanger 17. The opposite side of the heat exchanger 17 is connected by means of pipe 18 to the discharge side of a pump 19. The inlet side of pump 19 is connected by means of pipe 20 to a cylinder 21 in which a piston 22 is slidably positioned. The interior of the cylinder 21 is also connected to pipe 23 which connects into the coupling 15.

In the operation of the circuit illustrated in Fig. 6, the pump 19 is driven while engagement of the clutch takes place, that is while driven shaft 13 is being brought from its existing velocity, or state of rest, to the velocity of driving shaft 12; or alternatively it may be continuously driven, and functions to circulate liquid through the external circuit comprising the heat exchanger 17 and cylinder 21 and also circulates liquid through the clutch 14. When the piston 22 is in retracted position, the liquid in the hydraulic circuit is not at sufficient pressure to cause engagement of the elements of the clutch 14. When it is desired to actuate the clutch, that is to engage shafts 12 and 13, the piston 22 is moved inwardly into the cylinder 21 and thus the liquid in the hydraulic circuit is pressurized, the pressure being a substantially static pressure. The pump 19 may be of any convenient type since the only function of the pump 19 is to maintain circulation of liquid through the system, the actuating pressure in this case being established by the piston and cylinder arrangement hereinbefore described.

Referring particularly to Figs. 1 and 2, a clutch is shown which embodies the features of the present invention. The clutch is indicated generally by the reference numeral 24 and may be employed in either of the circuits shown in Figs. 5 or 6, and in the present description, clutches 3 and 14 may be of similar construction to that of clutch 24.

The clutch 24 comprises a driven member 25 which is slidably but non-rotatably mounted at its hub portion 26 by means of key 27 upon a driven shaft 28 of a power transmission system. The clutch also comprises a driving member 29, which, in turn, comprises a laterally movable section, hereinafter referred to as piston section 30, and a fixed section, hereinafter referred to as cylinder section 31. At its radial central portion, piston section 30 is slidably but non-rotatably mounted upon driving shaft 32. At its radial central portion, cylinder section 31 is secured to driving shaft 32 so that no movement may take place between cylinder section 31 and driving shaft 32.

A housing 33 embraces shaft 32 but is maintained stationary. The housing 33 is provided with an annular bore 34 which opens toward the surface of shaft 32, said annular bore being in communication with a transverse bore 35 provided in said shaft, the transverse bore, in turn, communicating with an axial bore 36, also provided in said shaft. A rotary seal 54, or other conventional type of rotary packing, is provided between housing 33 and shaft 32 to seal annular bore 34 from communication with the outside atmosphere. A pipe 37 connects into the annular bore 34 and comprises a liquid outlet for the clutch, as will be hereinafter more fully described. The pipe 37 corresponds to either pipe 10 or pipe 23 shown in Figs. 5 and 6, respectively.

The housing 33 is also provided with a relatively enlarged annular bore 38. A pipe 39 connects with the bore 38 and comprises the liquid inlet pipe to the clutch 24, corresponding to either pipes 4 or 16 of Figs. 5 and 6, respectively. The section of housing 33 which separates annular bore 34 from annular bore 38 closely embraces shaft 32, so that shaft 32 is free to rotate therein, but leakage of liquid between annular bore 34 and annular bore 38 is substantially prevented. As will be hereinafter more fully described, the annular bore 38 connects into the interiors of sections 30 and 31 and also to an actuating space therebetween whereby the sections 30 and 31 may be laterally separated.

The driven member 25 comprises a disc or circular plate 40 which radiates from hub 26, said disc, adjacent its outer periphery carrying, by means of bolts 41, a pair of spaced inwardly extending annular flanges 42 and 43, the flanges being separated by an annular ring 44 through which the bolts extend. The inner face of flange 42 carries an annular frictional ring or clutch facing 45 and the inner face of flange 43 carries a similar clutch facing 46.

The driving section 31 comprises a circular plate 47 which is laterally offset at an intermediate portion to form an offset boss 48 on one side and an inwardly depressed recess or cylindrical space 49. Adjacent its inner radial portion, the boss 48 is again offset to form an outwardly extending boss 50 which forms the hub of the driving section 31. The boss or hub 50 is rigidly secured to shaft 32 and abuts the housing 33, being sealed from said housing by rotary seal 51 or other conventional type of rotary packing.

The plate 47 adjacent its outer periphery is provided with an annular recess 52 which is closed on that side which faces the clutch facing 46 by an annular pressure plate 53. The plate 47 is provided with diametrically opposed radial bores 55 and 56. The bore 55 communicates with the diametrically opposed bore 56. The bore 55 communicates at its outer end with the annular recess 52, and at its opposite end, connects with a cross bore 57 provided in boss 48. Boss 48 is also provided with a radial bore 58 which at one end connects with cross bore 57 and at its opposite end connects with cross bore 59, the latter communicating with the annular space 38 provided in the coupling 33. Thus, liquid from pipe 39 may be transferred from space 38, through bores 59, 58, 57 and 55 to the annular space 52.

The bore 56 also connects at one end with the annular space 52 and at its opposite end connects with a cross bore 60 provided in boss 48. The cross bore 60 is in communication with a radial bore 62, also provided in boss 48, which connects with transverse bore 63 provided in driving shaft 32, said latter bore connecting with the axial bore 36 which, in turn, connects with pipe 37.

Thus a liquid circuit is established through the annular space 52 whereby liquid circulating therein contacts the rear face of pressure plate 53 and functions to cool said plate as said plate is heated by slippage occurring with the facing 46.

The driving section 30 comprises a circular plate 64 having an offset hub or piston portion 65 which extends into the cylindrical recess 49 provided adjacent the hub of section 31. The plate 64 is provided, adjacent its outer periphery, with an annular recess 66, similar to recess 52, the recess 66 being closed by pressure plate 67 which faces clutch facing 45. The plate 64 is provided with diametrically opposite radial bores 68 and 69. The bore 68 connects at one end into space 66 and at its opposite end connects with cross bore 70 which, in turn, communicates with the space 49. The bore 69 connects with a radial bore 71 provided in shaft 32 which, in turn, connects with axial bore 36.

Thus, a circulating path is established from pipe 39, through space 38, cross bore 59, space 49, cross bore 70 and radial bore 68 to the annular cooling space 66, and from said latter space through bore 69, radial bore 71, axial bore 36, radial bore 35, space 34 to outlet pipe 37. In passing through the annular cooling space 66, the liquid contacts the rear face of the pressure plate 67 and cools the same. Conventional O-rings 73 and 73' are provided to prevent leakage to the outside atmosphere, and will hereinafter be described further.

In the operation of clutch 24, said clutch may be connected in either of the circuits illustrated in Figs. 5 and 6 in the manner contemplated for clutches 3 and 14. In normal inoperative position of the clutch, that is, when pressure plates 53 and 67 are respectively spaced from the facings 46 and 45, liquid circulates through the clutch under the influence of the pumps 7 or 19, but said liquid is not of sufficient pressure to actuate the clutch. To actuate, or engage the clutch, throttle valve 9 is restricted or piston 22 is moved inwardly with respect to cylinder 21 and, hence, the liquid in the system is pressurized.

When the liquid is thus pressurized, the hub or piston portion 65 moves outwardly with respect to recess 49 in the manner of a piston operating in a cylinder and, hence, section 30 moves outwardly away from section 31, so that pressure plate 67 engages clutch facing 45, causing driven member 25 to slide axially on shaft 28 until clutch facing 46 engages pressure plate 53. The clutch is thereby engaged and shaft 32 proceeds to drive shaft 28. The engaging pressure is determined by the liquid pressure in zone or space 49 which is dependent primarily upon the pressure established by pump 7 or piston 22. The pressure due to centrifugal force upon the liquid in zone 49 is minor since said zone is relatively concentrated adjacent the axis of rotation and although some pressure increase occurs in said zone due to centrifugal force when the clutch rotates rapidly, this increase in pressure is negligible in controlling or causing engagement of the clutch. The centrifugal pressure radially outwardly from zone 49, that is, in the annular cooling spaces 52 and 66, is substantially greater than that existing in zone 49. However, since the pressure existing in zone 49 actuates the clutch, neither the greater pressure in cooling spaces 52 and 66 or the pressure variations with rotary speed, have any effect on the actuation of the clutch.

To cause the contracting movement of the sections 30 and 31 when the pressure of the liquid in zone 49 goes below engagement pressure, an annular recess 72 is provided in the inner wall of the recess 49 in which a conventional O-ring 73 is positioned, and a similar annular recess 72' is positioned. The O-rings are of such character that they oppose torsional movement, that is, when the clutch is engaged, the torsion and compression built up in the O-rings oppose the outward movement of the sections, but when the liquid pressure is reduced, the torsion and compression so built up in the O-rings relieves itself by moving the sections together.

The provision of O-rings 73 and 73' for normally moving the sections out of engagement constitutes, per se, no part of the present invention, the same function being performable by tension springs (not shown) for normally resiliently urging the sections toward each other.

Referring particularly to Figs. 3 and 4 a modification of the present invention is shown. The reference numeral 74 indicates generally a clutch embodying the concepts of the present invention for controllably connecting a driving shaft 75 to a driven shaft 76. The clutch 74 comprises essentially a driven member 77 and a driving member comprising driving sections 79 and 80.

The driven member 77 comprises a plate or disc 81 having a hub 82 which is slidably but non-rotatably mounted upon the driven shaft 76 by means of a key 83. An annular ring 84 is carried at the outer periphery of the disc 81 and is adapted to carry an annular supporting plate 85 which is secured to the ring 84 by a plurality of bolts 86. The supporting ring 85 carries on opposite faces a clutch facing 87 and a clutch facing 88.

A housing 89 embraces cylindrical boss 95 of section 78 of driving member 80 but is maintained stationary. The housing is provided with a radial bore 90 which connects with liquid inlet pipe 91. The housing is also provided with a radial bore 92 which connects with discharge pipe 93.

Section 78 of the driving member 80 comprises a circular plate or disc 94 which adjacent its radial central portion carries an outwardly extending cylindrical boss 95. The boss 95 is provided with an annular space 96 into which the bore 90 connects. The annular space 96 is in communication with a cross bore 97. The bore 97 at one end is closed by plug 98. A rotary seal 99, or other conventional type of rotary packing, fills the annular space between housing 89 and an extended portion 100 of the cylindrical boss 95. A similar rotary seal 107 seals the annular space between the other end of housing 89 and the other end of cylindrical boss 95.

The section 80, adjacent its outer periphery is provided with an annular recess 101 and the disc or plate 94 is provided with diametrically opposite radially extending bores 102 and 103. The bore 102 at its outer end communicates with the annular space 101 and at its inner end communicates with the axial bore 97. The bore 103 at its outer end also communicates with the annular recess 101 and at its inner end communicates with a bore 104 provided in the cylindrical portion 95, said bore being parallel to the axis of shaft 75. The cylindrical boss 95 is also provided with an annular recess 105 which communicates with bore 92 in coupling 89 and which in turn communicates with discharge pipe 93.

That portion of boss 95 which separates annular space 96 from annular recess 105 fits closely within housing 89 in such fashion as to be free to rotate within housing 89 but the small radial clearance between boss 95 and housing 89 limits the leakage of liquid between annular space 96 and annular recess 105 to a negligible amount.

Adjacent the clutch facing 87, the recess is closed by an annular pressure plate 106 which, when the clutch is in engagement, makes frictional contact with the clutch facing 87.

The driving section 79 comprises a circular plate 108 which, adjacent its outer periphery, is provided with an annular recess 109, similar to the recess 101 in plate 94. Adjacent its radial inner portion, the plate 108 carries an outwardly extending cylindrical boss 110. A cap 111 is secured to the end of the driving shaft 75 by means of screw 112, said cap being provided with an annular flange 113 which extends over the cylindrical boss 110. The driving shaft 75 adjacent its end is of restricted diameter as shown at 114 in Fig. 4 and the cylindrical boss carries a radially inwardly extending portion 115 which extends into the cut-away portion of the shaft. The inner surface of the annular flange 113 carried by cap 111 is provided with an annular recess 116 in which a conventional O-ring 117 is positioned. The restricted portion 114 of shaft 75 is also provided with an annular recess 118 which is adapted to carry a similar O-ring 119.

The plate 108 comprising a portion of the driving section 79 is provided with diametrically oppositely extending radial bores 120 and 121. The bore 120 at its outer end communicates with the annular recess 109 and the bore 121 at its outer end also communicates with said annular recess. The inner end portion of the plate 108 is provided with a cross bore 122 which is in communication with the radial bore 120 at its inner end. The inner end of the radial bore 121 connects with a cross bore 123 also provided in the hub portion of the plate 108, said cross bore at one end communicating with a space 124 provided between the end of the cylindrical boss 110 and the inner face of the cap 111.

The plate 108 of driving section 79 on the side opposite the cylindrical boss 110 carries a pipe extension 125 which defines a zone 126 which is in communication with the cross bore 122. The plate 108 also carries a second pipe extension 127 which defines a cone 128 which is in communication with cross bore 123. The plate 94 of the driving section 80 carries a pipe extension 129 which defines a zone 130 which is in communication with the bore 97. The pipe extension 129 telescopically fits into pipe extension 125, an O-ring 131 being interposed between the two extensions. Thus, the zone 130 and zone 126 are in communication. The plate 94 also carries a pipe extension 132 which defines a zone 133, the extension 132 telescopically fitting into pipe extension 127. An O-ring 134 is interposed between the extensions 127 and 132 and the zones 128 and 133 are in communication with each other and in communication with the cross bore 104.

In the operation of the clutch 74, with liquid in the system under relatively low pressure, the pressure plates 106 and 106' are spaced from the clutch facings 87 and 88, respectively, as shown in Fig. 4. When the liquid in the system is pressurized by throttling valve 9 or depressing piston 22 the liquid pressure in the clutch increases, the liquid, however, continues to circulate through the clutch, being introduced through pipe 91 and passing into the annular space 96 wherefrom it passes to bore 97, through bore 102 to the annular cooling space 101. The liquid thus circulates through the annular space 101 cooling pressure plate 106 and returns through bore 103 to cross bore 104 and to the annular space 105 in coupling 89 and outwardly through pipe 93.

The introduced liquid also passes from bore 97, through zones 130 and 126 and from cross bore 122 to radial bore 120, wherefrom it passes to the annular cooling space 109. After dividing and circulating through the space 109, the liquid discharges through radial bore 121, cross bore 123, zones 128 and 133, bore 104, annular space 105 and discharges through pipe 93.

When the liquid in the clutch is pressurized, liquid under pressure enters the zone 124 between cap 111 and boss 110. Reacting against the cap 111, the boss 110 is thus moved by the pressurized liquid thereby moving pressure plate 106' into pressure contact with the clutch facing 88. The driven member 77 is thereby caused to move axially until clutch facing 87 is brought into pressure contact with pressure plate 106. Thus, both of the driving sections engage the respective clutch facings and the driven member 77 is driven.

To accommodate the axial movement of the driving section 79, section 79 is keyed to shaft 75 by means of key 135, and is thus slidably but non-rotatably associated with driving shaft 75. Driving section 80 is securely fastened to shaft 75 by means of key 136 so that it neither slides nor rotates on shaft 75.

Thus, when slippage occurs at the engaging surfaces of the clutch elements and heat is generated, said heat is carried away by the circulating cooling liquid and the liquid, in turn, is cooled in the external hydraulic circuit by the heat exchangers 5 or 17. The engaging pressure of the clutch is determined by the liquid pressure in the body of liquid contained in the piston and cylinder arrangement comprising boss 110 and the extension 95. The pressure due to centrifugal force upon said body of liquid is minor since said body of liquid is relatively concentrated adjacent the axis of rotation, and although some pressure increase occurs in said body of liquid due to centrifugal force when the clutch rotates rapidly, this increase in pressure is negligible in controlling or causing engagement of the clutch. The much larger centrifugal pressure radially outward from said body of liquid, that is, in the annular cooling spaces 101 and 109, has no effect on the actuation of the clutch, since said actuation is due to the pressure on the liquid contained in the piston and cylinder formed by boss 110 and extension 95.

When the liquid pressure in the system is reduced, by opening valve 9 or retracting piston 22, to disengage the clutch elements, the driving section 79 moves to its normal position, shown in Fig. 5, under the influence of the O-rings 117, 119, 131 and 134. The engaging movement of the driving section 79 torsions and compresses the O-rings 117, 119, 131 and 134 and, hence, when the liquid pressure in the system is reduced, the O-rings 117, 119, 131 and 134 function to move the section 79 to the left, as viewed in Fig. 5, thus releasing the clutch.

The provision of O-rings 117, 119, 131 and 134 for normally moving the section 79 out of engagement constitutes, per se, no part of the present invention, the same function being performable by compression springs (not shown) for normally resiliently urging the sections away from each other.

It is to be understood that sections 79 and 80 are of sufficient mechanical rigidity so that their deflection is negligible when forced against clutch facings 106 and 106' during engagement of the clutch.

In practice, the rear areas of the pressure plates 67, 53 (Fig. 2) and the pressure plates 106' and 106 (Fig. 5) subjected to the pressure of, that is, contacted by the liquid in zones 66 and 52 and zones 109 and 101, respectively, are preferably made equal to the areas of the contacting faces of the respective clutch facings 45, 46, 88 and 87. This insures the least amount of deflection in the pressure plates should the engagement pressure between a pressure plate and its adjacent clutch facing not be equal to the pressure existing in the liquid behind the pressure plate. Furthermore, it is desirable that the areas of the "pistons" which move the driving sections into engagement be made slightly greater than the areas of the pressure plates of said driving sections. Thus the engagement pressure between the pressure plates and their respective clutch facings, resulting from the action of the pressure in the liquid behind the "pistons" on the "piston" areas, can be made approximately equal to the liquid pressure behind the pressure plates, said pressure being the sum of the liquid pressure acting on the "pistons" plus the additional centrifugal pressure resulting from the greater radial distance from the axis of rotation to the pressure plates over the radial distance from the axis of rotation to the "pistons." The substantially equal pressures on either side of a pressure plate resulting therefrom insure a minimum amount of stress and deflection in the pressure plate.

In view of the fact that the pressure plates conduct heat from the clutch facings to the fluid coolant, the heat conductivity of said pressure plates should be as high as possible commensurate with adequate strength. A copper or copper alloy pressure plate is preferred but the material constituting the pressure plates can be best selected by taking into account the load and slippage characteristics in the intended use of the clutch.

Although the direction of flow of liquid to and from the clutch is indicated on the drawings, it is to be understood that the function of the liquid would be the same were the flow reversed and flow in either direction is contemplated. In addition, in both forms of the invention shown, the driving members are described as the liquid actuated and cooled members. Without departing from the concepts of the present invention, the driving members may, if desired, carry the clutch facings and the driven members may be the liquid actuated and liquid cooled members. These and other modifications may be made in the invention by any one skilled in the art without departing from the spirit of the invention and, hence, it is not intended that the invention be limited to the exact details shown and described except as necessitated by the appended claims.

I claim as my invention:

1. A liquid cooled hydraulically actuated clutch for power transmission purposes which comprises, an annular member and a companion annular member mounted respectively upon coaxially disposed shafts, said companion annular member comprising a pair of sections, said annular member being axially movable but non-rotatably mounted upon its shaft, one of said sections of the companion annular member being axially movable but non-rotatably mounted on its shaft, the other section being immovably mounted upon the last-mentioned shaft, a pressure plate carried by each of said sections radially spaced from the axis of rotation of said sections, clutch facings carried by said annular member in juxtaposition to said pressure plates, each of said sections being provided with an annular liquid circulating space adjacent each of said pressure plates, means carried by each of said sections adjacent the axis of rotation and connected to and radially spaced inwardly from said annular liquid circulating spaces for hydraulically moving said sections relative to each other to frictionally engage the pressure plates and clutch facings when liquid under pressure is passed to said last mentioned means, and means adjacent the axis of rotation for circulating liquid under pressure from a single source to and from and through said circulating spaces and said hydraulic means.

2. A liquid cooled hydraulically actuated clutch for power transmission purposes which comprises, an annular member and a companion annular member mounted respectively upon coaxially disposed shafts, said companion annular member comprising a pair of sections, said annular member being axially movable but non-rotatably mounted upon its shaft, one of said sections of the companion annular member being axially movable but non-rotatably mounted on its shaft, the other section being immovably mounted upon the last-mentioned shaft, a pressure plate carried by each of said sections radially spaced from the axis of rotation of said sections, clutch facings carried by said other member in juxtaposition to said pressure plates, each of said sections being provided with an annular liquid circulating space adjacent each of said pressure plates, hydraulic reaction means carried by each of said sections adjacent the axis of rotation and connected to and radially spaced inwardly from said annular liquid circulating spaces for hydraulically moving one of said sections with respect to the shaft upon which it is carried and in opposite relative directions with respect to each other to frictionally engage the juxtaposed pressure plates and clutch facings when liquid under pressure is passed to said last mentioned means, and means adjacent the axis of rotation for introducing and discharging liquid under pressure to and from a single source through said circulating spaces and said hydraulic reaction means.

3. A liquid cooled hydraulically actuated clutch for power transmission purposes which comprises, an annular driven member slidably but non-rotatably mounted upon a driven shaft, a pair of clutch rings carried by said driven member at a predetermined distance from the axis of rotation of said driven member, a driving member mounted upon a driving shaft coaxially disposed with the driven shaft, said driving member comprising a pair of annular driving sections disposed adjacent said driven member, one of said sections being stationary with respect to said driving shaft and the other section being slidably but non-rotatably carried by said driving shaft, a pressure plate carried by each driving section, each of said driving sections being provided with an annular liquid circulating space adjacent each of said pressure plates, means carried by each of said driving sections and connected to said circulating spaces and spaced radially inwardly from said clutch rings and from said liquid circulating spaces for hydraulically moving said slidable section to engage the pressure plate carried thereby with one of the clutch rings carried by said driven member and to move the latter member toward said stationary section to engage the pressure plate carried by the stationary section and the other clutch ring carried by the driven member, and means adjacent the axis of rotation for circulating liquid under pressure from a single source to and from and through said circulating spaces and said hydraulic means.

4. A liquid cooled hydraulically actuated clutch for power transmission purposes which comprises, an annular driven member slidably but non-rotatably mounted upon a driven shaft, clutch rings carried by said driven member at a predetermined distance from the axis of rotation of said driven member, a driving member mounted upon a driving shaft coaxially disposed with the driven shaft, said driving member comprising a pair of annular driving sections disposed adjacent said driven member, one of said sections being stationary with respect to said driving shaft and the other section being slidably but non-rotatably carried by said driving shaft, a pressure plate carried by each driving section, a piston portion carried by one of said sections, a cylinder portion carried by the other section for reciprocally receiving said piston portion, said piston and cylinder portion being spaced radially inwardly from said clutch rings, said sections being provided with annular cooling liquid circulating spaces adjacent said pressure plates, said spaces being connected to said cylinder portion, and means for circulating liquid under pressure to said cooling spaces in heat interchange relationship with said pressure plates and in said cylinder portion to move one section toward said driven member and move said driven member toward said stationary section to frictionally engage the respective pressure plates and clutch rings.

5. A liquid cooled hydraulically actuated clutch for power transmission purposes which comprises, an annular driven member slidably but non-rotatably mounted upon a driven shaft, clutch rings carried by said driven member at a predetermined distance from the axis of rotation of said driven member, a driving member mounted upon a driving shift coaxially disposed with the driven shaft, said driving member comprising a pair of annular driving sections disposed adjacent said driven member, one of said sections being stationary with respect to said driving shaft and the other section being slidably but non-rotatably carried by said driving shaft, a pressure plate carried by each driving section, a piston portion carried by one of said sections, a cylinder portion carried by the other section for reciprocally receiving said piston portion, said piston and cylinder portion being spaced radially inwardly from said clutch rings, said sections being provided with annular cooling liquid circulating spaces adjacent said pressure plates, and connected to said cylinder portion and a liquid inlet and outlet to said sections adjacent the axis of rotation thereof and radially spaced inwardly from said cooling spaces for the circulation of liquid in heat interchange relationship with said pressure plates and through said cylinder portion to move one section toward said driven member and move said driven member toward said stationary section to frictionally engage the respective pressure plates and clutch rings.

6. A liquid cooled hydraulically actuated clutch for power transmission purposes which comprises, an annular driven member slidably but non-rotatably mounted upon a driven shaft, a pair of clutch rings mounted on opposite faces of said driven member, a driving member mounted upon a driving shaft coaxially disposed with respect to the driven shaft, said driving member comprising a pair of annular driving sections, one section being disposed on each side of said driven member, one of said sections being stationary with respect to said driving shaft and the other section being slidably but non-rotatably carried by said driving shaft, a pressure plate carried by each driving section disposed adjacent the respective clutch rings, each of said driving sections being provided with a confined annular liquid circulating space adjacent each of said pressure plates, means carried by each of said driving sections and connected to and spaced radially inwardly from said clutch rings and from said liquid circulating spaces for hydraulically moving said slidable section to engage the pressure plate carried thereby with one clutch ring carried by said driven member and to move the latter member toward said stationary section to engage the pressure plate carried by the stationary section and the other clutch ring carried by the driven member, and means adjacent the axis of rotation for circulating liquid under pressure from a single source to and from and through said circulating spaces and said hydraulic means.

7. A liquid cooled hydraulically actuated clutch for power transmission purposes which comprises, an annular driven member slidably but non-rotatably mounted upon a driven shaft, a pair of clutch rings mounted on opposite faces of said driven member, a driving member mounted upon a driving shaft coaxially disposed with respect to the driven shaft, said driving member comprising a pair of annular driving sections, one section being disposed on each side of said driven member, one of said sections being stationary with respect to said driving shaft and the other section being slidably but non-rotatably carried by said driving shaft, a pressure plate carried by each driving section disposed adjacent the respective clutch rings, a piston portion carried by one of said sections, a cylinder portion carried by the other section for reciprocally receiving said piston portion, said piston and cylinder portions being spaced radially inwardly from said clutch rings, said sections being provided with annular cooling liquid circulating spaces connected to said cylinder portion and adjacent said pressure plates, and means for circulating liquid under pressure to said cooling spaces in heat interchange relationship with said pressure plates and in said cylinder portion to move one section toward said driven member and move said driven member toward said stationary section to frictionally engage the respective pressure plates and clutch rings.

8. A liquid cooled hydraulically actuated clutch for power transmission purposes which comprises, an annular driven member slidably but non-rotatably mounted upon a driven shaft, a pair of laterally spaced clutch rings carried by said driven member at a predetermined distance from the axis of rotation of said driven member, said clutch rings facing each other, a driving member mounted upon a driving shaft coaxially disposed with respect to the driven shaft, said driving member comprising a pair of annular driving sections disposed between the clutch rings of said driven member, one of said sections being stationary with respect to said driving shaft and the other section being slidably but non-rotatablly carried by said driving shaft, a pressure plate carried by each driving section disposed adjacent the respective clutch rings, each of said driving sections being provided with a closed annular liquid circulating space adjacent each of said pressure plates, means carried by each of said driving sections and spaced radially inwardly from said clutch rings and from said liquid circulating spaces for hydraulically moving said slidable section to engage the pressure plate carried thereby with one clutch ring carried by said driven member and to move the latter member toward said stationary section to engage the pressure plate carried by the stationary section and the other clutch ring carried by the driven member, and means adjacent the axis of rotation for circulating liquid under pressure from a single source through said circulating spaces and said hydraulic means.

References Cited in the file of this patent

UNITED STATES PATENTS

| | | |
|---|---|---|
| 464,949 | Alden | Dec. 15, 1891 |
| 506,517 | Leibert | Oct. 10, 1893 |
| 2,002,058 | Gregg | May 21, 1935 |
| 2,152,489 | Lamb | Mar. 28, 1939 |
| 2,734,607 | Hindmarch | Feb. 14, 1956 |

FOREIGN PATENTS

| | | |
|---|---|---|
| 13,106 | Great Britain | of 1912 |
| 896,915 | Germany | Nov. 16, 1953 |
| 162,101 | Australia | Mar. 22, 1955 |